United States Patent
Bellamkonda

(10) Patent No.: US 9,268,817 B2
(45) Date of Patent: Feb. 23, 2016

(54) EFFICIENT EVALUATION OF HIERARCHICAL CUBES BY NON-BLOCKING ROLLUPS AND SKIPPING LEVELS

(75) Inventor: Srikanth Bellamkonda, Sunnyvale, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1487 days.

(21) Appl. No.: 11/862,158

(22) Filed: Sep. 26, 2007

(65) Prior Publication Data

US 2009/0083253 A1    Mar. 26, 2009

(51) Int. Cl.
*G06F 17/30* (2006.01)

(52) U.S. Cl.
CPC .... *G06F 17/30489* (2013.01); *G06F 17/30592* (2013.01)

(58) Field of Classification Search
None
See application file for complete search history.

(56) References Cited

U.S. PATENT DOCUMENTS

| | | | |
|---|---|---|---|
| 5,963,936 A * | 10/1999 | Cochrane et al. | |
| 6,775,681 B1 * | 8/2004 | Ballamkonda et al. | 707/718 |
| 6,775,682 B1 * | 8/2004 | Ballamkonda et al. | |
| 7,035,843 B1 * | 4/2006 | Bellamkonda et al. | |
| 7,636,731 B2 | 12/2009 | Cruanes et al. | |
| 7,958,113 B2 | 6/2011 | Fan et al. | |
| 2002/0194157 A1 | 12/2002 | Zait et al. | |
| 2003/0084025 A1 | 5/2003 | Zuzarte | |
| 2004/0215626 A1 | 10/2004 | Colossi et al. | |
| 2004/0225639 A1 | 11/2004 | Jakobsson et al. | |
| 2005/0027690 A1 * | 2/2005 | Zhang et al. | 707/3 |
| 2005/0251511 A1 | 11/2005 | Shankar et al. | |
| 2009/0150336 A1 | 6/2009 | Basu et al. | |
| 2009/0150413 A1 | 6/2009 | Basu et al. | |

OTHER PUBLICATIONS

U.S. Appl. No. 12/181,994, filed Jul. 29, 2008, Examiners Answers, Nov. 20, 2013.

* cited by examiner

*Primary Examiner* — Anh Tai Tran
(74) *Attorney, Agent, or Firm* — Hickman Palermo Becker Bingham LLP

(57) ABSTRACT

Techniques are described herein for efficiently evaluating database queries that include hierarchical cube computations. During second and subsequent evaluation phases (if any), a database server does not re-determine groups (nor re-aggregate within such groups) that have already been determined in a previous evaluation phase. Instead, according to a technique described herein, whenever an evaluation phase subsequent to the first evaluation phase is performed, the database server immediately outputs or otherwise returns certain groups and aggregate results that were determined based on certain grouping column sets that were generated in the previous evaluation phase. The database server does not aggregate within these certain groups when performing aggregation in the current evaluation phase, thereby avoiding the duplication of work already performed during previous evaluation phases.

16 Claims, 4 Drawing Sheets

EFFICIENT EVALUATION OF HIERARCHICAL CUBES BY NON-BLOCKING ROLLUPS AND SKIPPING LEVELS

RELATED APPLICATION

This application is related to U.S. Pat. No. 7,035,843, which was filed Feb. 15, 2002 and is titled "EVALUATION OF DATABASE HIERARCHICAL CUBES BY NESTING ROLLUP OPERATORS ASSOCIATED WITH MULTIPLE GROUPINGS." The entire contents of U.S. Pat. No. 7,035,843 are incorporated by reference for all purposes as if fully disclosed herein.

FIELD OF THE INVENTION

This relates generally to database management systems and, more specifically, to techniques for efficiently evaluating database queries including hierarchical cubes.

BACKGROUND

In a database management system (DBMS), data is stored in one or more data containers. Each container contains records. The data within each record is organized into one or more fields. In relational database management systems, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

Database management systems retrieve information in response to receiving queries that specify the information to retrieve. In order for a database management system to understand the query, the query should conform to a database language recognized by the database management system, such as the Structured Query Language (SQL).

In an OLAP (on-line analytical processing) environment or a data warehousing environment, data is often organized into a star schema. A star schema is distinguished by the presence of one or more relatively large tables and several relatively smaller tables. Rather than duplicating the information contained in the smaller tables, the large tables contain references (foreign key values) to rows stored in the smaller tables. The larger tables within a star schema are referred to as "fact tables," while the smaller tables are referred to as "dimension tables." Different dimension tables represent different dimensions. Typically, each dimension has "levels" which correspond to columns of the dimension table, which are organized in a hierarchical manner. The items in the levels at the top of the hierarchy typically contain (or could contain) multiple instances of items from levels further below in the hierarchy. For example, a TIME dimension might consist of the levels year, quarter, month, and day, corresponding to columns of the TIME table. The hierarchical organization is such that years consist of quarters, quarters consist of months, and months consist of days.

Records in a fact table usually refer to records in dimension tables using corresponding foreign key values. A particular foreign key value in a single column of a fact table can refer to a corresponding multi-column record (associated with a same key value) in a dimension table. As a result, the fact table can be expressed in a more condensed manner; the fact table can contain fewer columns. The columns of a fact table will often be columns that contain either (a) foreign key values that correspond to key values in dimension tables (often, the fact table will contain one such column for each separate dimension table—e.g., TIME, REGION—to which the fact table refers) or (b) scalar (non-enumerated) "measure" values, such as, for example, a sales amount. The columns of a dimension table will often be columns that contain either (a) key values to which the foreign key values in a particular column of the fact table correspond or (b) enumerated values, such as, for example, actual displayable values for year (e.g., "1999"), quarter (e.g., "Q1"), month (e.g., "JAN"), region (e.g., "WEST"), and state (e.g., "CA"). In a dimension table, each different combination of enumerated values in that dimension table is associated with key value that is unique within that dimension table, so that the fact table can refer to a specific combination of values represented in the dimension table by referring to that associated key value. For example, a TIME dimension table might contain a row for the (year, quarter, month) combination ("1999," "Q1," "JAN"), and this row might be associated with the key value "1." In the fact table, there may be one or more rows in which the value of a "TIME" column contains the foreign key value "1" to refer to the specific combination ("1999," "Q1," "JAN") in the TIME dimension table.

Aggregate Function

An important function for data generation and retrieval performed by a database management system is the generation of aggregated information. Aggregated information is information derived by applying an aggregate function to the values in a column of a subset of rows in a table or on the result of a join of two or more tables. Examples of aggregate functions are functions that sum values, calculate averages, and determine minimum and maximum values. The column that contains the values to which an aggregate function is applied is referred to as the measure.

The subsets of rows to which an aggregate function is applied are determined by values in "group-by" columns. The aggregate information generated by a database management system is presented as a result set having the group-by column(s) and the aggregated measure column. In particular, the result set has one row for each unique value in the group-by column. Each row in the result set corresponds to the group of rows in the base table containing the value for the group-by column of the row. The measure column in the row contains the output of the aggregate function applied to the values in the measure column of the group of rows.

Aggregate information is generated by a database management system in response to receiving an aggregate query. An aggregate query specifies a group-by column, the aggregate measure column, and the aggregate function to apply to the measure values. The following query is provided as an illustration.

SELECT d, SUM(S) sum_s
FROM t
GROUP BY d

Table t contains data representing the sales of an organization. Each row represents a particular sales transaction. For a particular row in table t, column d contains the date of the sales transaction, and s contains the sale amount.

The SELECT clause contains "SUM(s)", which specifies that the aggregate function "sum" is to be applied to the values in column s (aggregate measure) of table t. The query also includes the group-by clause "GROUP BY d", which denotes column d as the group-by column.

Execution of this query generates a result set with a column for d and a column for sum (s). A particular row in the result set represents the total sales (s) for all sale transactions in a given day (d). Specifically, for a particular row in the result set, d contains a unique date value from table t for column d. Column sum_s contains the sum of the sales amount values in column s for the group of rows from t that have the unique date value in column d.

It is often useful to generate aggregate information grouped by multiple columns. For example, table t may also contain column r, a column containing values representing regions. It is may be useful to generate a result set that summarizes sales by region, and for each region, sales date. Such a result set may be generated by referencing column r and d in the group-by clause, as illustrated by the following query.

SELECT d, r SUM (s)
    FROM t
    GROUP BY r, d

Often, a query that includes an aggregate function specifies that information from one table is to be aggregated by groupings defined by keys of another table.

Rollup Operator

A useful way to provide aggregate information is to generate one result set that groups data by various combinations of columns. For example, a result set may contain a set of rows grouped by region and date, and a set of rows grouped only by region. Such a result set may be generated by submitting a query that includes multiple subqueries operated upon by the union operator. While union queries may be used to generate a result set with multiple groupings, they can be very tedious to write. The programmer of such subqueries is forced to write a subquery for each desired grouping, which may become extraordinarily burdensome when the number of groupings desired is relatively large. Furthermore, such queries are very inefficient to execute, as some tables are accessed multiple times.

To avoid this burden, SQL defines extended group-by operations. Extended group-by operations include cube, rollup, and grouping sets. The group-by operators are used to specify groupings that include various combinations of the columns specified as arguments to the operators. For example, using the rollup operator, a query may be written as follows.

SELECT year, quarter, month, SUM(sales)
    FROM fact.time
    WHERE fact.tkey=time.tkey
    GROUP BY rollup(year, quarter, month).

According to techniques that employ sort-based algorithms, execution of this query first joins the table fact with the table time to get the values of year, quarter, and month for each fact table row. The joined data is sorted on grouping keys (columns), i.e., on (year, quarter, month) for the current example. Next, the query aggregates the sorted data on one column (sales). The rollup operator aggregates data across levels specified as the keys (or columns) of the rollup operator, specified in the GROUP BY line. For example, "GROUP BY rollup(year, quarter, month)" produces aggregated results on the following groups:

(year, quarter, month);
    (year, quarter);
    (year); and
    ( ).

A rollup on n columns produces n+1 groups. The grand total (referred to as the highest or coarsest) group is the ( ) grouping, and the base (referred to as the lowest or finest) group is the (year, quarter, month) grouping.

Hierarchical Cube

Concatenation of multiple rollup operators in a database query results in a hierarchical cube. A hierarchical cube is a data set where the data is aggregated along hierarchies of dimensions. Hierarchical cube computation is common and useful in data warehousing applications and business intelligence processing. For example, a query that includes a hierarchical cube—that is, a query that includes a GROUP BY clause that includes multiple rollup operators—is illustrated in the following example.

SELECT year, quarter, month, region, state SUM(sales)
    FROM fact, time, geography
    WHERE    fact.timekey=time.timekey    and fact.geographykey=geography.geographykey
    GROUP BY rollup(year, quarter, month), rollup(region, state).

Execution of this query aggregates data according to the aggregate function, SUM(sales), across levels of multiple hierarchies. In other words, execution of the query will perform a cross-product on the aggregations generated by each rollup operator.

For example, rollup(year, quarter, month) produces the following groupings:

(year, quarter, month);
    (year, quarter);
    (year);
    ( ).

Furthermore, rollup(region, state) produces the following groupings:

(region, state);
    (region);

Hence, concatenation of the previous rollups produces the following twelve groupings:

(year, quarter, month, region, state);
    (year, quarter, month, region);
    (year, quarter, month);
    (year, quarter, region, state);
    (year, quarter, region);
    (year, quarter);
    (year, region, state);
    (year, region);
    (year);
    (region, state);
    (region);
    ( ).

Given a hierarchical cube specification with n number of rollups ($r\_1, \ldots R\_n$), with each rollup $R\_i$ having $a\_i$ number of keys, the number of result groupings is $(a\_1+1)*(a\_2+1)*\ldots*(a\_n+1)$. Some prior approaches to evaluating a query that includes a hierarchical cube will scan and sort the base table as many times as the number of resulting groupings. For example, using such prior approaches, one would require twelve scans and sorts to compute the above query.

Query Evaluation

One might specify a materialized view in terms of a query that contains multiple rollup operators in a "group by" clause. For example, if a DIMENSION1 dimension table contained columns A and B, and if a DIMENSION2 dimension table contained columns C and D, then one might create such a materialized view through the following command:

CREATE MATERIALIZED VIEW "SALES_CUBE" AS
SELECT A, B, C, D, SUM(amount_sold)
FROM FACT, DIMENSION1, DIMENSION2
WHERE FACT.D1KEY=DIMENSION1.D1KEY AND
  FACT.D2KEY=DIMENSION2.D2KEY
GROUP BY ROLLUP(A, B),
  ROLLUP(C, D);

In the preceding query, "ROLLUP(A, B)" is referred to below as the "first rollup operator," and "ROLLUP(C, D)" is referred to as the "second rollup operator." When the query in the preceding command is evaluated, the following "grouping column sets" are generated: (A, B, C, D), (A, B, C) (A, B), (A, C, D), (A, C), (A), and ( ). Rows are grouped together into groups based on those grouping column sets, and aggregation on "amount_sold" is performed within each such group.

For example, when grouping is performed based on the (A, B, C, D) grouping column set, all rows that have the same combination of values within columns A, B, C, and D will be placed in the same group (regardless of whether the values of the other columns in those rows are similar or dissimilar). For each such resulting group (a separate group for each distinct combination of values that occurs in columns A, B, C, and D), the "amount_sold" values of the rows in that group will be summed separately from any other group.

For another example, when grouping is performed based on the (A) grouping column set, all rows that have the same value within column A will be placed in the same group (regardless of whether the values of the other columns in those rows are similar or dissimilar). For each such resulting group (a separate group for each distinct value that occurs in column A), the "amount_sold" values of the rows in that group will be summed separately from any other group.

For yet another example, when grouping is performed based on the ( ) grouping column set, all rows will be placed in the same group (regardless of whether the values of the columns in those rows are similar or dissimilar). The "amount_sold" values of the rows in that group will be summed, so that exactly one sum will be computed for the single "grand total" group.

More specifically, using past approaches for query evaluation, a database server first scans the involved tables and performs join operations. Next, in a "first" evaluation phase, the database server generates multiple "first phase" grouping column sets. The database server generates a separate first phase grouping column set for each distinct "hierarchically possible" combination of grouping keys specified in the query's first rollup operator (those grouping keys being A and B in the foregoing example). As used herein, a combination of grouping keys is only considered to be "hierarchically possible" if, for any particular grouping key contained in the combination, the combination also contains all of the grouping keys that are hierarchically superior to the particular grouping key in the particular grouping key's dimension. Thus, if A (e.g., "year") is hierarchically superior to B (e.g., "month") in a particular dimension (e.g., "time"), then the combinations (A, B) and (A) would be hierarchically possible (assuming that A has no hierarchical superiors in the particular dimension), but the combination (B) would not be hierarchically possible because the combination (B) omits A, which is hierarchically superior to B in B's dimension. As used herein, combination consisting of no grouping keys at all— denoted ( )—is a hierarchically possible combination with respect to any dimension.

In order to generate a first phase grouping column set for a particular hierarchically possible combination of grouping keys specified in the query's first rollup operator, the following operations are performed. First, all grouping keys specified in all of the query's rollup operators (those grouping keys being A, B, C, and D in the foregoing example) are placed in the first phase grouping column set. Next, the grouping keys specified in the query's first rollup operator (those grouping keys being A and B in the foregoing example) are removed from the first phase grouping column set. Next, the grouping keys in the particular hierarchically possible combination of grouping keys specified in the query's first rollup operator are added back into the first phase grouping set.

Thus, in the foregoing example, the hierarchically possible combinations of grouping keys specified in the query's first rollup operator are (A, B), (A), and ( ). Therefore, in the foregoing example, the database server generates the following first phase grouping column sets: (A, B, C, D), (A, C, D), and (C, D), corresponding respectively to the hierarchically possible combinations (A, B), (A), and ( ) from the query's first rollup operator.

The database server groups rows together into "first phase" groups based on each such first phase grouping column set. The database server aggregates within each such resulting first phase group and then passes the first phase groups and their corresponding aggregation results to the next evaluation phase.

Next, in a "second" evaluation phase, the database server generates multiple "second phase" grouping column sets. The database server generates multiple second phase grouping column sets for each first phase grouping column set generated in the first evaluation phase. For each such first phase grouping column set, the database server generates a separate second phase grouping column set for each distinct hierarchically possible combination of grouping keys specified in the query's second rollup operator (those grouping keys being C and D in the foregoing example).

In order to generate a second phase grouping column set for a particular first phase grouping column set and a particular hierarchically possible combination of grouping keys specified in the query's second rollup operator, the following operations are performed. First, all grouping keys specified in the particular first phase grouping column set are placed in the second phase grouping column set. Next, the grouping keys specified in the query's second rollup operator (those grouping keys being C and D in the foregoing example) are removed from the second phase grouping column set (if they are present therein). Next, the grouping keys in the particular hierarchically possible combination of grouping keys specified in the query's second rollup operator are added back into the second phase grouping set.

Thus, in the foregoing example, the hierarchically possible combinations of grouping keys specified in the query's second rollup operator are (C, D), (C), and ( ). In the foregoing example, the database server generates the following corresponding second phase grouping column sets based on the first phase grouping column set (A, B, C, D): (A, B, C, D), (A, B, C), and (A, B). Additionally, in the foregoing example, the database server generates the following corresponding second phase grouping column sets based on the first phase grouping column set (A, C, D): (A, C, D), (A, C), and (A). Additionally, in the foregoing example, the database server generates the following corresponding second phase grouping column sets based on the first phase grouping column set (C, D): (C, D), (C), and The database server groups rows together into "first phase" groups based on each such first phase grouping column set. The database server aggregates within each such resulting first phase group and then passes the first phase groups and their corresponding aggregation results to the next ("second") evaluation phase.

The database server groups rows together into "second phase" groups based on each such second phase grouping column set. The database server aggregates within each such resulting second phase group and then passes the second phase groups and their corresponding aggregation results to the next evaluation phase (if any).

With aggregation completed, for each group determined in the previous evaluation phases, the database server outputs or otherwise returns (e.g., by inserting into a table that represents the materialized view) the values for that group and the aggregation result computed for that group.

The query evaluation approach discussed above is somewhat inefficient due in part to some duplicated efforts. A more efficient query evaluation approach for evaluating queries that contain multiple rollup operators in a group by clause is needed.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
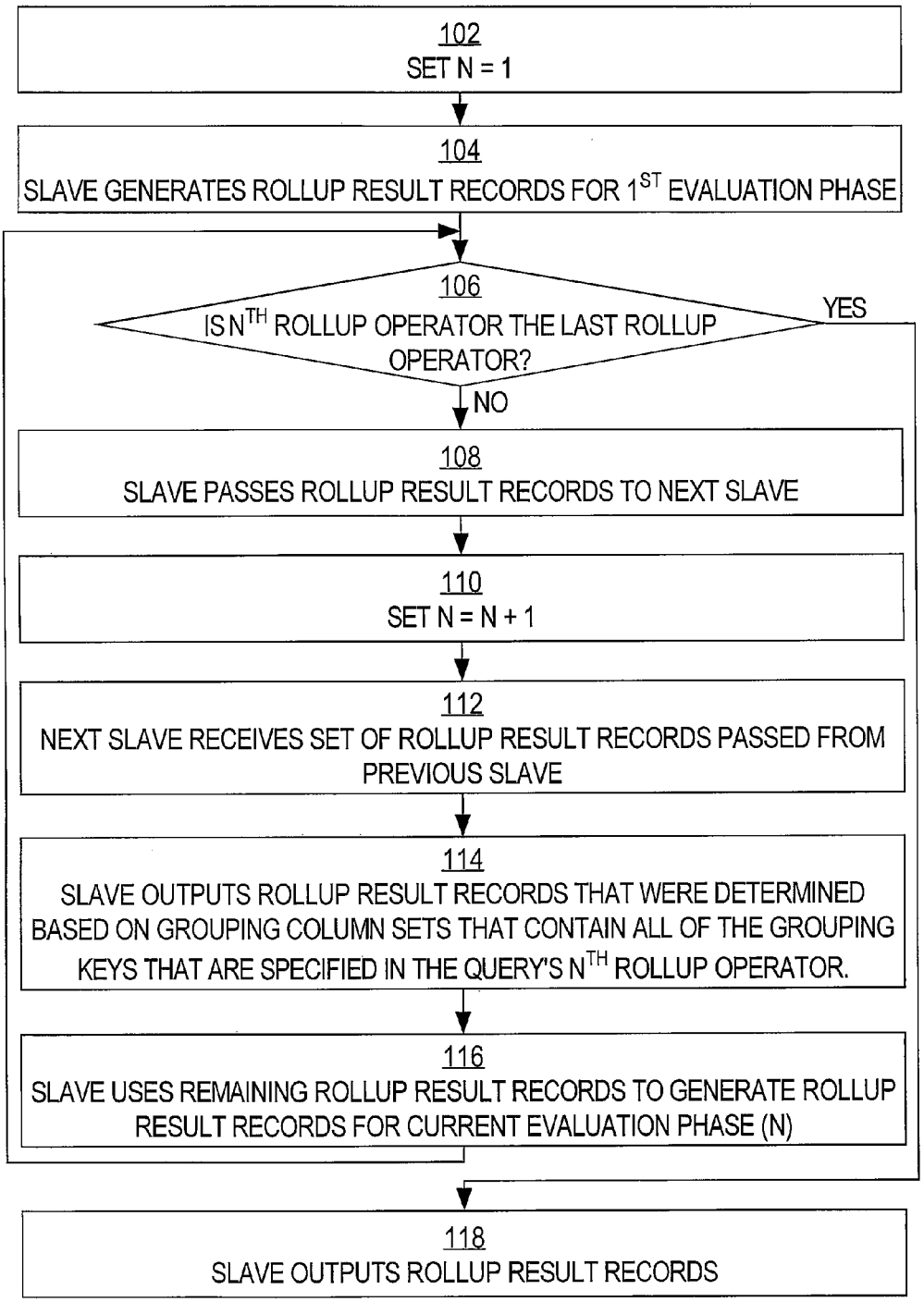
FIG. 1 is a flowchart illustrating a technique for evaluating a query with a concatenation of rollup operators (a hierarchical cube), according to an embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

Techniques are described herein for efficiently evaluating database queries that include hierarchical cube computations—that is, a concatenation of rollup operators. As can be seen from the discussion above in the Background section, past approaches for evaluating queries that contain multiple rollup operators in a group by clause have been inefficient in some respects. Specifically, past approaches involved some unnecessary computations. For example, as can be seen from the last example in the Background section, in the first evaluation phase, groups were determined based on the first phase grouping column sets (A, B, C, D), (A, C, D), and (C, D). Aggregation was performed within the resulting groups. Then, in the second evaluation phase, groups were determined based on the second phase grouping column sets (A, B, C, D), (A, B, C), (A, B), (A, C, D), (A, C), (A), (C, D), (C), and ( ). Aggregation was performed within the resulting groups. An inefficiency results from the fact that in both the first and the second evaluation phases, groups were determined (and aggregation was performed in such groups) based on grouping column sets (A, B, C, D), (A, C, D), and (C, D).

According to a technique described herein, during second and subsequent evaluation phases (if any), a database server does not re-determine groups (nor re-aggregate within such groups) that have already been determined in a previous evaluation phase. Instead, according to a technique described herein, whenever an evaluation phase subsequent to the first evaluation phase is performed, the database server immediately outputs or otherwise returns certain groups and aggregate results that were determined based on certain grouping column sets that were generated in the previous evaluation phase. The database server does not aggregate within these certain groups when performing aggregation in the current evaluation phase, thereby avoiding the duplication of work already performed during previous evaluation phases.

More specifically, according to a technique described herein, during the $i^{th}$ evaluation phase, where i is greater than one, the database server outputs or otherwise returns (instead of waiting until all of the evaluation phases have been completed) the groups and aggregate results that were determined based on certain grouping column sets that contain all of the grouping keys specified in the query's $i^{th}$ rollup operator. During the $i^{th}$ evaluation phase, where i is greater than one, the database server skips grouping and aggregating based on these certain grouping column sets.

Thus, referring back to the last example in the Background section, the grouping keys specified in the query's second rollup operator are C and D. Therefore, according to a technique described herein, during the second evaluation phase, the database server outputs or otherwise returns (instead of waiting until all of the evaluation phases have been completed) the groups and aggregate results that were determined based on the grouping column sets that contain both C and D—namely, (A, B, C, D), (A, C, D), and (C, D). Additionally, during the second evaluation phase, the database server skips these grouping column sets for the purposes of determining groups and aggregating within those groups. Consequently, in the foregoing example, during the second evaluation phase, the database server determines groups based only on grouping column sets (A, B, C), (A, B), (A, C), (A), (C), and ( ), and aggregates only within the resulting groups-skipping grouping column sets (A, B, C, D), (A, C, D), and (C, D).

According to a technique described herein, a database server evaluates queries that contain hierarchical cube computations using the techniques that are disclosed in U.S. Pat. No. 7,035,843, except with the modifications described herein. Thus, according to certain techniques described herein, a database server still computes results for each rollup operator—other than the first—based on the result records from the previous rollup operator. Additionally, according to certain techniques described herein, a database server still computes grouping identifiers to uniquely identify each grouping level of each rollup operator.

Various implementations of the techniques described are embodied in methods, apparatus, and in computer-readable media.

Nested Rollup Evaluation

FIG. 1 is a flowchart illustrating a technique for evaluating a query with a concatenation of rollup operators (a hierarchical cube), according to an embodiment of the invention. In one embodiment, a database server (and/or the slaves thereof) performs the following technique after performing scanning and joining operations on the tables specified in the query (e.g., the fact table and the relevant dimension tables). In block 102, N is set to equal one. N represents the current evaluation phase.

In block 104, a slave (e.g., a process or thread) within and/or under the control of the database server generates rollup result records for the $1^{st}$ evaluation phase, using a technique described below with reference to FIG. 2.

In block 106, if the $N^{th}$ rollup operator is the last rollup operator in the query's "group by" clause, then control passes to block 118. Otherwise, control passes to block 108.

In block 108, the slave passes the rollup result records that were generated during evaluation phase N to another slave that will be performing the next evaluation phase (i.e., evaluation phase N+1). In block 110, N is incremented by one.

In block 112, the slave that is performing evaluation phase N receives a set of rollup result records from the slave that performed the rollup operation during the previous evaluation phase (i.e., during evaluation phase N−1). In block 114, the slave outputs or otherwise returns, as at least a part of the results of the query, each such received rollup result record that was determined based on a column grouping set that contains all of the grouping keys that are specified in the query's $N^{th}$ rollup operator—that is, the $N^{th}$ rollup operator that is specified in the query's "group by" clause. In one embodiment of the invention, these outputted rollup result records are not processed further. Because these rollup result records are outputted before all of the evaluation phases have completed, the evaluation operation is "non-blocking."

In block 116, the slave generates rollup result records for the $N^{th}$ evaluation phase, using a technique described below with reference to FIG. 3. Control passes back to block 106.

Alternatively, in block 118, the slave outputs or otherwise returns, as at least a part of the results of the query, the rollup result records that were generated in evaluation phase N. At this point, the evaluation operation is complete.

Generating First Phase Rollup Result Records

Figure 2:
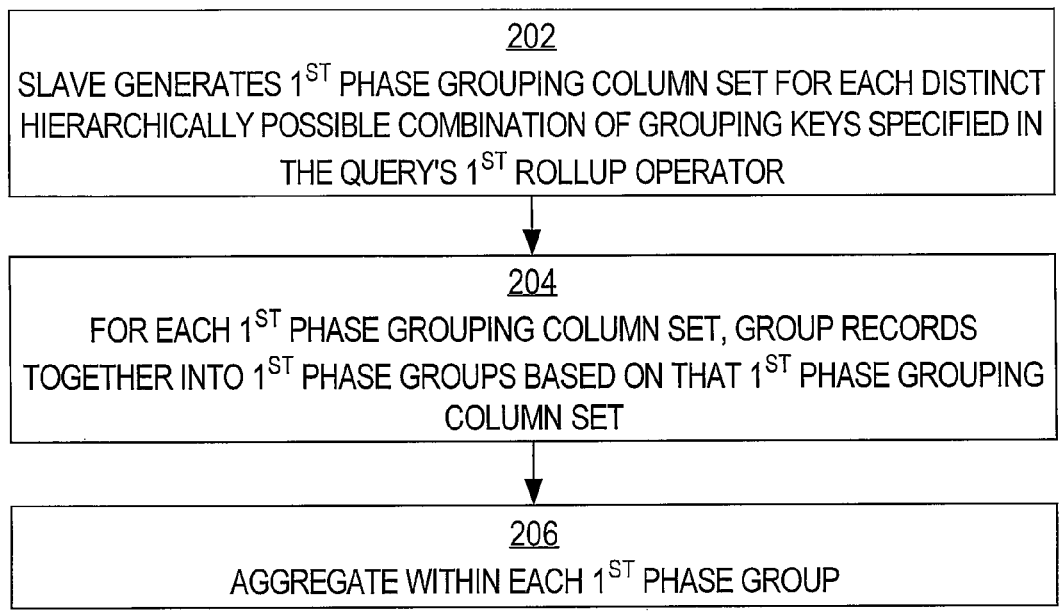
FIG. 2 is a flowchart illustrating a technique for generating first phase rollup result records (i.e., when N is equal to one), according to an embodiment of the invention.

FIG. 2 is a flowchart illustrating a technique for generating first phase rollup result records (i.e., when N is equal to one), according to an embodiment of the invention. In block 202, the slave generates a separate first phase grouping column set for each distinct hierarchically possible combination of grouping keys specified in the query's first rollup operator. For example, if the query's first rollup operator is "ROLLUP (A, B)," then the hierarchically possible combinations of grouping keys would be (A, B), (A), and ( ).

In one embodiment of the invention, in order to generate a first phase grouping column set for a particular hierarchically possible combination of grouping keys specified in the query's first rollup operator, the following operations are performed. First, all grouping keys specified in all of the query's rollup operators are placed in the first phase grouping column set. Next, the grouping keys specified in the query's first rollup operator are removed from the first phase grouping column set. Next, the grouping keys in the particular hierarchically possible combination of grouping keys specified in the query's first rollup operator are added back into the first phase grouping set. For example, the first phase grouping column sets (A, B, C, D), (A, C, D), and (C, D) might be generated for the hierarchically possible combinations (A, B), (A), and ( ), respectively.

In block 204, for each particular first phase grouping column set generated in block 202, table rows are grouped together into "first phase" groups based on the particular first phase grouping column set. For example, if the particular first phase grouping column set is (A, B, C, D), then all table rows having the same combination of values in columns A, B, C, and D are placed together in a group. For another example, if the particular first phase grouping column set is (A, B, C), then all table rows having the same combination of values in columns A, B, and C are placed together in a group.

In block 206, aggregating (e.g., summing or some other aggregation operation specified in the query) is performed within each first phase group formed in block 204. For each first phase group, the shared combination of values in that first phase group's members and the result of the aggregation within that first phase group comprise the rollup result record for that first phase group.

Generating $N^{th}$ Phase Rollup Result Records

Figure 3:
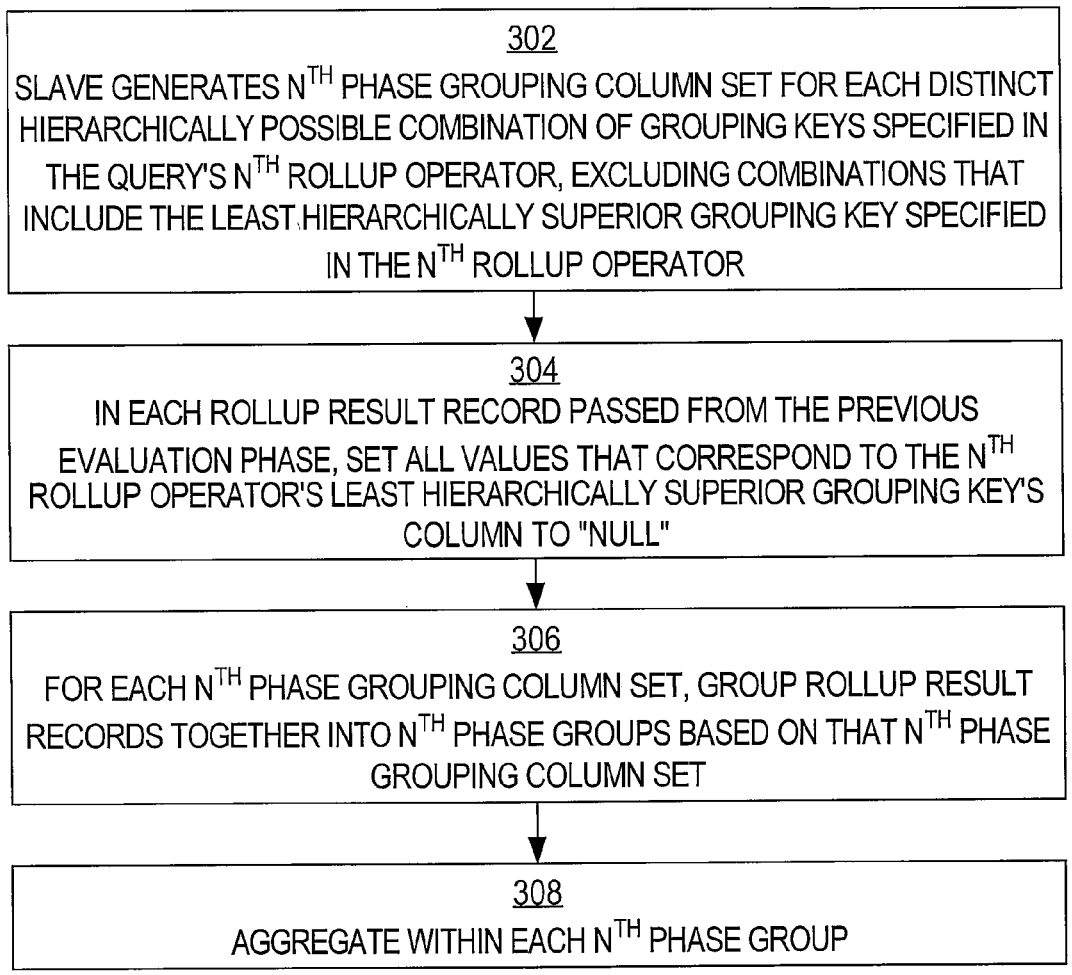
FIG. 3 is a flowchart illustrating a technique for generating $N^{th}$ phase rollup result records when N is greater than one, according to an embodiment of the invention.

FIG. 3 is a flowchart illustrating a technique for generating $N^{th}$ phase rollup result records when N is greater than one, according to an embodiment of the invention. In block 302, the slave generates a separate $N^{th}$ phase grouping column set for each distinct hierarchically possible combination of grouping keys specified in the query's $N^{th}$ rollup operator, excluding and skipping combinations that include the least hierarchically superior of those grouping keys. For example, if the query's $N^{th}$ rollup operator is "ROLLUP(C, D)," then the hierarchically possible combinations of grouping keys, excluding combinations that include the least hierarchically superior grouping key (in this example, D), would be (C) and ( ).

In one embodiment of the invention, in order to generate an $N^{th}$ phase grouping column set for a particular hierarchically possible combination of grouping keys specified in the query's $N^{th}$ rollup operator, the following operations are performed. First, all grouping keys specified in all of the query's rollup operators are placed in the $N^{th}$ phase grouping column set. Next, the grouping keys specified in the query's $N^{th}$ rollup operator, except for the least hierarchically superior grouping key in that rollup operator, are removed from the $N^{th}$ phase grouping column set. Next, the grouping keys in the particular hierarchically possible combination of grouping keys specified in the query's $N^{th}$ rollup operator are added back into the $N^{th}$ phase grouping set. Again, in one embodiment of the invention, $N^{th}$ phase grouping column sets are not generated for hierarchically possible combinations that contain the least superior grouping key in the query's $N^{th}$ rollup operator.

In block 304, each rollup result record passed from the previous evaluation phase (N−1) is modified so that all of that rollup result record's values that correspond to the query's $N^{th}$ rollup operator's least hierarchically superior grouping key's column are set to NULL. For example, if the query's $N^{th}$ rollup operator's least hierarchically superior grouping key is D, then, in each such passed-in rollup result record, all values that correspond to column D are set to NULL.

In block 306, for each particular $N^{th}$ phase grouping column set generated in block 302, the passed-in rollup result records (as modified in block 304) are grouped together into "$N^{th}$ phase" groups based on the particular $N^{th}$ phase grouping column set. For example, if the particular $N^{th}$ phase grouping column set is (A, B, C, D), then all previous-phase rollup result records having the same combination of values in columns A, B, C, and D are placed together in a group. For another example, if the particular $N^{th}$ phase grouping column set is (A, B, D), then all previous-phase rollup result records having the same combination of values in columns A, B, and D are placed together in a group.

In block 308, aggregating (e.g., summing or some other aggregation operation specified in the query) is performed within each $N^{th}$ phase group formed in block 306. For each $N^{th}$ phase group, the shared combination of values in that $N^{th}$ phase group's members and the result of the aggregation within that $N^{th}$ phase group comprise the rollup result record for that $N^{th}$ phase group.

In one embodiment of the invention, grouping column sets additionally include a "group identifier" or "gid," and each passed-in rollup result record is also associated with such a "gid." In such an embodiment of the invention, the grouping of passed-in rollup result records is based at least in part on the gids that are associated with those passed-in rollup result records, such that only passed-in rollup result records that are associated with that same gid are placed in the same $N^{th}$ phase group. Techniques for creating and using gids to ensure grouping correctness are discussed further in U.S. Pat. No. 7,035,843.

For example, a query might specify a group-by clause such as "GROUP BY ROLLUP(a, b), ROLLUP(c, d), ROLLUP(e, f)." Under such circumstances, in the first rollup phase, groups are computed based on a, b, c, d, ROLLUP(e, f)—in other words, based on the following grouping column sets: (a, b, c, d, e, f), (a, b, c, d, e), and (a, b, d, e). Additionally, a first phase grouping ID (referred to herein as gid_1) is computed based on the full set of grouping keys (in this case, (a, b, c, d, e, f)). In this example, gid_1 would be 0, 1, or 3.

Continuing the example, in the second rollup phase, rows received from the first rollup phase are passed on as they are. For such rows, the second phase grouping ID (referred to herein as gid_2) is equal to gid_1. Groups are computed based on a, b, e, f, gid_1, d, rollup(c) by inserting, into a data structure, rows that were received from the previous evaluation phase except with values corresponding to column "d" set to NULL. In this example, gid_2 is computed as gid_2=gid_1+bin_to_num(0, 0, grouping(c), 1, 0, 0). The function "grouping(c)" results in the values 0 and 1 for the groupings (c) and ( ), respectively. The bin_to_num function converts binary representations to decimal representations. Thus, in this example, bin_to_num produces binary 000100 (or decimal 4) for groupings with (c), and bin_to_num produces binary 001100 (or decimal 12) for groupings with ( ). Thus, the gid_2 values are gid_1+4 or gid_1+12. The values of gid_2 for rows emerging from the second rollup phase will be 0, 1, or 3 (for pass-through rows—these are the same as the gid_1 values), 4, 5, or 7 (due to the addition of 4 to the gid_1 values for those rows in the group based on the grouping (c)), and 12, 13, or 15 (due to the addition of 12 to the gid_1 values for those rows in the group based on the grouping 0).

Continuing the example, in the third rollup phase, processing is performed similarly to the processing performed in the second rollup phase. In the third rollup phase, gid_3=gid_2+bin_to_num(grouping(a), 1, 0, 0, 0, 0). Thus, the gid_3 values are 0, 1, 3, 4, 5, 7, 12, 13, or 15 (for pass-through rows—these are the same as the gid_2 values), 16, 17, 19, 20, 21, 23, 28, 29, or 31 (due to the addition of 16 (binary 010000) to the gid_2 values for those rows in the group based on the grouping (a)), and 48, 49, 51, 52, 53, 55, 60, 61, or 63 (due to the addition of 48 (binary 110000) to the gid_2 values for those rows in the group based on the grouping ( )).

EXAMPLE

The following is a sample hierarchical cube query:
SELECT
   y year, q quarter, m month,
   cl class, ch channel,
   co country, st state, cy city;
   ca category, sc subcategory, pd prod,
   sum(amount) amount_sold,
   sum(quantity) qty_sold
FROM sales, time, channel, geography, product
WHERE <join conditions between sales, time, channel, geography and product>
GROUP BY
   ROLLUP(y, q, m), /*TIME dimension*/
   ROLLUP(cl, ch), /*CHANNEL dimension*/
   ROLLUP(co, st, cy), /*GEOGRAPHY dimension*/
   ROLLUP(ca, sc, pd); /*PRODUCT dimension*/

According to a previous approach, the foregoing query would have been evaluated in the following manner: (1) join the sales and dimension tables; (2) GROUP BY y, q, m, co, st, cy, ca, sc, pd, ROLLUP(cl, ch); (3) GROUP BY y, q, m, cl, ch, ca, sc, pd, ROLLUP(co, st, cy); (4) GROUP BY y, q, m, cl, ch, co, st, cy, ROLLUP(ca, sc, pd); (5) GROUP BY cl, ch, co, st, cy, ca, sc, pd, ROLLUP(y, q, m).

However, according to an embodiment of the invention, the foregoing query is evaluated in the following more efficient manner instead: (1) join the sales and dimension tables; (2) GROUP BY y, q, m, co, st, cy, ca, sc, pd, ROLLUP(cl, ch); (3) GROUP BY y, q, m, cl, ch, ca, sc, pd, cy, ROLLUP(co, st); (4) GROUP BY y, q, m, cl, ch, co, st, cy, pd, ROLLUP(ca, sc); (5) GROUP BY cl, ch, co, st, cy, ca, sc, pd, m, ROLLUP(y, q).

Thus, according to an embodiment of the invention, "cy" level (the least hierarchically superior group key in the GEOGRAPHY dimension) is skipped in phase (3), "pd" level (the least hierarchically superior group key in the PRODUCT dimension) is skipped in phase (4), and "m" level (the least hierarchically superior group key in the TIME dimension) is skipped in phase (5). The skipped level key values are also set to NULL in the rollup result records before grouping and aggregation takes place in a given phase. In one embodiment of the invention, the rollups with skipped levels are non-blocking and will return their input immediately.

Beneficially, certain embodiments of the invention consume fewer resources (e.g., CPU, memory, and disk space) and exhibit superior performance in comparison to prior approaches for evaluating hierarchical cube queries.

Composite Columns

In one embodiment of the invention, a query can specify a group-by clause that contains one or more "composite columns," which are based on multiple actual columns. For example, in a group-by clause such as "GROUP BY ROLLUP(a, (b, c), d)," "(b, c)" is a composite column that is based on actual columns b and c together. When such a clause is processed, the following grouping column sets are generated: (a, b, c, d), (a, b, c), (a), and ( ). Under such circumstances, whenever b or c is present in a grouping column set, the other one or b or c also will be present in the grouping column set, since b and c are specified together in a virtual column. This may be contrasted to the simple group-by clause "GROUP BY ROLLUP (a, b, c, d)," which will produce grouping column sets: (a, b, c, d), (a, b, c), (a, b), (a), and ( )—in the grouping column set (a, b), b is separated from c, which would never be the case in grouping column sets generated based on the composite column-containing group-by clause "GROUP BY ROLLUP(a, (b, c), d)." Thus, in one embodiment of the invention, one can cause the database server to treat multiple columns as a single column for purposes of rollup operations by enclosing multiple grouping keys together inside parenthesis within the ROLLUP function.

Embodiments of the invention described above also can be applied to group-by clauses that specify composite columns within their ROLLUP functions. For example, the techniques described above could be applied equally well to a query that contained a group-by clause such as "GROUP BY ROLLUP (a, (b, c)), ROLLUP((c, d), (e, f)), ROLLUP (g, (h, i), (k, l))."

Hardware Overview

Figure 4:
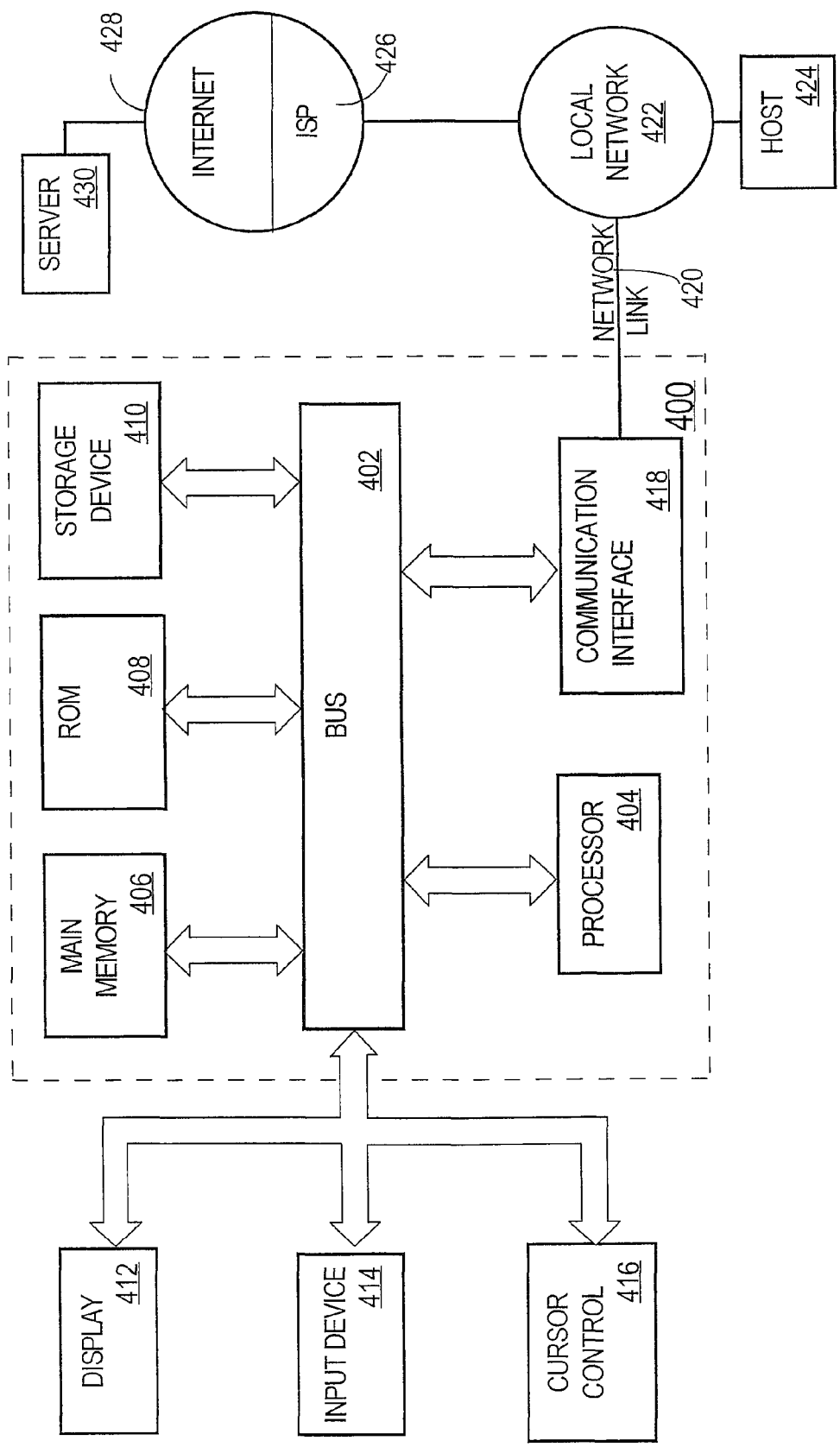
FIG. 4 is a block diagram of a computer system upon which embodiments of the invention may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The terms "machine-readable medium" and "computer-readable medium" as used herein refer to any medium that participates in providing data that causes a machine or computer, respectively, to operate in a specific fashion. In an embodiment implemented using computer system 400, various machine-readable media are involved, for example, in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. The terms "machine-readable storage medium" and "computer-readable storage medium" refer to volatile and non-volatile media upon which data can be stored. Transmission media includes coaxial cables, copper wire and fiber optics, including the wires that comprise bus 402. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use a transmitter to convert the data to a signal. A detector can receive the data carried in the signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
    generating two or more different first phase grouping column sets based at least in part on grouping keys that are specified in a first rollup operator of two or more rollup operators that are included in a database query;
    based on the two or more first phase grouping column sets, generating a plurality of first phase groups of records;
    wherein generating the plurality of first phase groups of records comprises grouping records into one or more first phase groups of records for each first phase grouping column set of the two or more first phase grouping column sets,
    after generating the plurality of first phase groups of records, generating a separate first phase rollup result record for each first phase group of records of the plurality of first phase groups of records;
    generating, in a manner that avoids duplicating any of the first phase grouping column sets, two or more different second phase grouping column sets based at least in part on grouping keys that are specified in a second rollup operator of the two or more rollup operators;
    based on the two or more second phase grouping column sets, generating a plurality of second phase groups of records;
    wherein generating the plurality of second phase groups of records comprises grouping first phase rollup result records into one or more separate second phase groups of records for each second phase grouping column set; and
    after generating the plurality of second phase groups of records, generating a separate second phase rollup result record for each second phase group of records of the plurality of second phase groups of records;
    wherein the method is performed by one or more computing devices.

2. The method of claim 1, wherein generating the two or more different first phase grouping column sets comprises:
    determining a plurality of different hierarchically possible combinations of grouping keys that are specified in the first rollup operator; and
    for each particular hierarchically possible combination of the plurality of hierarchically possible combinations, generating a particular first phase grouping column set that corresponds to the particular hierarchically possible combination by performing steps comprising:
        placing, into the particular first phase grouping column set, all grouping keys specified in the two or more rollup operators except for the grouping keys specified in the first rollup operator; and
        placing, into the particular first phase grouping column set, all grouping keys that are in the particular hierarchically possible combination.

3. The method of claim 1, wherein generating the two or more different second phase grouping column sets comprises:
    determining a plurality of different hierarchically possible combinations of grouping keys that are specified in the second rollup operator; and
    for each particular hierarchically possible combination of the plurality of hierarchically possible combinations except for hierarchically possible combinations that include the least hierarchically superior grouping key in the second rollup operator, generating a particular second phase grouping column set that corresponds to the particular hierarchically possible combination by performing steps comprising:
        placing, into the particular second phase grouping column set, all grouping keys specified in the two or more rollup operators except for grouping keys that are hierarchically superior to the least hierarchically superior grouping key specified in the second rollup operator; and
        placing, into the particular second phase grouping column set, all grouping keys that are in the particular hierarchically possible combination.

4. The method of claim 1, wherein generating the plurality of first phase groups of records comprises:
    for each particular first phase grouping column set of the two or more first phase grouping column sets, grouping records into one or more first phase groups of records that correspond to the particular first phase grouping column set by performing steps comprising:
        for each possible combination of values that can occur in a combination of columns in the particular first phase grouping column set, placing, into a first phase group of records that corresponds to that combination of values, records that have that combination of values.

5. The method of claim 1, wherein generating the plurality of second phase groups of records comprises:
    for each particular second phase grouping column set of the two or more second phase grouping column sets, grouping first phase rollup result records into one or more second phase groups of records that correspond to the particular second phase grouping column set by performing steps comprising:
        for each possible combination of values that can occur in a combination of columns in the particular second phase grouping column set, placing, into a second phase group of records that corresponds to that combination of values, first phase rollup result records that have that combination of values.

6. The method of claim 1, wherein generating a separate first phase rollup result record for each first phase group of records of the plurality of first phase groups of records comprises:
    performing an aggregation function relative to measure column values that are associated with records in one of the first phase groups of records, thereby generating a first aggregate result for records in that one of the first phase groups of records; and
    performing the aggregation function relative to measure column values that are associated with records in another of the first phase groups of records, thereby generating a second aggregate result for records in that other of the first phase groups of records;

wherein the first aggregate result differs from the second aggregate result.

7. The method of claim 1, further comprising:

generating, in a manner that avoids duplicating any of the second phase grouping column sets, two or more different third phase grouping column sets based at least in part on grouping keys that are specified in a third rollup operator of the two or more rollup operators;

after generating the second phase rollup result records, outputting one or more of the second phase result records;

after outputting the one or more of the second phase result records, based on the two or more third phase grouping column sets, generating a plurality of third phase groups of records;

generating a separate third phase rollup result record for each third phase group of records of the plurality of third phase groups of records; and outputting each third phase rollup result record;

wherein generating the two or more different third phase grouping column sets comprises: determining a plurality of different hierarchically possible combinations of grouping keys that are specified in the third rollup operator; and for each particular hierarchically possible combination of the plurality of hierarchically possible combinations except for hierarchically possible combinations that include the least hierarchically superior grouping key in the third rollup operator, generating a particular third phase grouping column set that corresponds to the particular hierarchically possible combination by performing steps comprising: placing, into the particular third phase grouping column set, all grouping keys specified in the two or more rollup operators except for grouping keys that are hierarchically superior to the least hierarchically superior grouping key specified in the third rollup operator; and placing, into the particular third phase grouping column set, all grouping keys that are in the particular hierarchically possible combination;

wherein generating the plurality of third phase groups of records comprises: for each particular third phase grouping column set of the two or more third phase grouping column sets, grouping second phase rollup result records into one or more third phase groups of records that correspond to the particular third phase grouping column set by performing steps comprising: for each possible combination of values that can occur in the combination of columns in the particular third phase grouping column set, placing, into a third phase group of records that corresponds to that combination of values, second phase rollup result records that have that combination of values;

wherein the one or more of the second phase result records that are output are not processed in generating the plurality of third phase groups of records.

8. The method of claim 1, further comprising:

after generating the first phase rollup result records, returning, as results to the database query, the first phase rollup result records;

wherein the one or more of the first phase result records that are returned as results are not processed in generating the plurality of second phase groups of records;

wherein the one or more of the first phase result records are returned as results before generating the separate second phase rollup result records has completed.

9. A non-transitory computer-readable storage medium storing sequences of instructions, that when executed by one or more processors, cause:

generating two or more different first phase grouping column sets based at least in part on grouping keys that are specified in a first rollup operator of two or more rollup operators that are included in a database query;

based on the two or more first phase grouping column sets, generating a plurality of first phase groups of records;

wherein generating the plurality of first phase groups of records comprises grouping records into one or more first phase groups of records for each first phase grouping column set of the two or more first phase grouping column sets, after generating the plurality of first phase groups of records, generating a separate first phase rollup result record for each first phase group of records of the plurality of first phase groups of records;

generating, in a manner that avoids duplicating any of the first phase grouping column sets, two or more different second phase grouping column sets based at least in part on grouping keys that are specified in a second rollup operator of the two or more rollup operators;

based on the two or more second phase grouping column sets, generating a plurality of second phase groups of records;

wherein generating the plurality of second phase groups of records comprises grouping first phase rollup result records into one or more separate second phase groups of records for each second phase grouping column set; and after generating the plurality of second phase groups of records, generating a separate second phase rollup result record for each second phase group of records of the plurality of second phase groups of records.

10. The computer-readable storage medium of claim 9, wherein instructions for generating the two or more different first phase grouping column sets comprise instructions for:

determining a plurality of different hierarchically possible combinations of grouping keys that are specified in the first rollup operator; and for each particular hierarchically possible combination of the plurality of hierarchically possible combinations, generating a particular first phase grouping column set that corresponds to the particular hierarchically possible combination by:

placing, into the particular first phase grouping column set, all grouping keys specified in the two or more rollup operators except for the grouping keys specified in the first rollup operator; and placing, into the particular first phase grouping column set, all grouping keys that are in the particular hierarchically possible combination.

11. The computer-readable storage medium of claim 9, wherein instructions for generating the two or more different second phase grouping column sets comprises: instructions for determining a plurality of different hierarchically possible combinations of grouping keys that are specified in the second rollup operator; and for each particular hierarchically possible combination of the plurality of hierarchically possible combinations except for hierarchically possible combinations that include the least hierarchically superior grouping key in the second rollup operator, generating a particular second phase grouping column set that corresponds to the particular hierarchically possible combination by:

placing, into the particular second phase grouping column set, all grouping keys specified in the two or more rollup operators except for grouping keys that are hierarchically superior to the least hierarchically superior grouping key specified in the second rollup operator; and placing, into the particular second phase grouping column set, all grouping keys that are in the particular hierarchically possible combination.

12. The computer-readable storage medium of claim 9, wherein instructions for generating the plurality of first phase groups of records comprise instructions for:

for each particular first phase grouping column set of the two or more first phase grouping column sets, grouping records into one or more first phase groups of records that correspond to the particular first phase grouping column set by:

for each possible combination of values that can occur in a combination of columns in the particular first phase grouping column set, placing, into a first phase group of records that corresponds to that combination of values, records that have that combination of values.

13. The computer-readable storage medium of claim 9, wherein instructions for generating the plurality of second phase groups of records comprise instructions for:

for each particular second phase grouping column set of the two or more second phase grouping column sets, grouping first phase rollup result records into one or more second phase groups of records that correspond to the particular second phase grouping column set by:

for each possible combination of values that can occur in a combination of columns in the particular second phase grouping column set, placing, into a second phase group of records that corresponds to that combination of values, first phase rollup result records that have that combination of values.

14. The computer-readable storage medium of claim 9, wherein instructions for generating a separate first phase rollup result record for each first phase group of records of the plurality of first phase groups of records comprise instructions for:

performing an aggregation function relative to measure column values that are associated with records in one of the first phase groups of records, thereby generating a first aggregate result for records in that one of the first phase groups of records; and performing the aggregation function relative to measure column values that are associated with records in another of the first phase groups of records, thereby generating a second aggregate result for records in that other of the first phase groups of records;

wherein the first aggregate result differs from the second aggregate result.

15. The computer-readable storage medium of claim 9, wherein the sequences of instructions further include instructions, that when executed by one or more processors, cause:

generating, in a manner that avoids duplicating any of the second phase grouping column sets, two or more different third phase grouping column sets based at least in part on grouping keys that are specified in a third rollup operator of the two or more rollup operators;

after generating the second phase rollup result records, outputting one or more of the second phase result records;

after outputting the one or more of the second phase result records, based on the two or more third phase grouping column sets, generating a plurality of third phase groups of records;

generating a separate third phase rollup result record for each third phase group of records of the plurality of third phase groups of records; and outputting each third phase rollup result record;

wherein instructions for generating the two or more different third phase grouping column sets comprise instructions for: determining a plurality of different hierarchically possible combinations of grouping keys that are specified in the third rollup operator; and for each particular hierarchically possible combination of the plurality of hierarchically possible combinations except for hierarchically possible combinations that include the least hierarchically superior grouping key in the third rollup operator, generating a particular third phase grouping column set that corresponds to the particular hierarchically possible combination by: placing, into the particular third phase grouping column set, all grouping keys specified in the two or more rollup operators except for grouping keys that are hierarchically superior to the least hierarchically superior grouping key specified in the third rollup operator; and placing, into the particular third phase grouping column set, all grouping keys that are in the particular hierarchically possible combination;

wherein instructions for generating the plurality of third phase groups of records comprise instructions for: for each particular third phase grouping column set of the two or more third phase grouping column sets, grouping second phase rollup result records into one or more third phase groups of records that correspond to the particular third phase grouping column set by: for each possible combination of values that can occur in the combination of columns in the particular third phase grouping column set, placing, into a third phase group of records that corresponds to that combination of values, second phase rollup result records that have that combination of values;

wherein the one or more of the second phase result records that are output are not processed in generating the plurality of third phase groups of records.

16. The computer-readable storage medium of claim 9, wherein the sequences of instructions further includes instructions that, when executed by one or more processors, cause:

after generating the first phase rollup result records, returning, as results to the database query, the first phase rollup result records;

wherein the one or more of the first phase result records that are returned as results are not processed in generating the plurality of second phase groups of records;

wherein the one or more of the first phase result records are returned as results before generating the separate second phase rollup result records has completed.

\* \* \* \* \*